United States Patent
Zheng et al.

(10) Patent No.: US 12,035,405 B2
(45) Date of Patent: Jul. 9, 2024

(54) METHODS AND SYSTEMS FOR LOW POWER RECONNECTION

(71) Applicant: Meta Platforms Technologies, LLC, Menlo Park, CA (US)

(72) Inventors: Dong Zheng, Saratoga, CA (US); Amit Shukla, Fremont, CA (US); Gang Lu, Pleasanton, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/155,602

(22) Filed: Jan. 22, 2021

(65) Prior Publication Data

US 2022/0240339 A1  Jul. 28, 2022

(51) Int. Cl.
*H04W 76/19* (2018.01)
*H04W 40/24* (2009.01)
*H04W 52/02* (2009.01)

(52) U.S. Cl.
CPC ........ *H04W 76/19* (2018.02); *H04W 40/244* (2013.01); *H04W 52/0216* (2013.01); *H04W 52/0251* (2013.01)

(58) Field of Classification Search
CPC ..... H04W 84/12; H04W 84/18; H04W 48/16; H04W 88/02; H04W 88/08; H04W 52/0209; H04W 52/0212; H04W 52/0216; H04W 52/0251; H04W 52/0254; H04W 52/0258; H04W 40/24; H04W 40/244; H04W 76/19; Y02D 30/70
See application file for complete search history.

(56) References Cited

U.S. PATENT DOCUMENTS

| 2003/0114204 | A1* | 6/2003 | Allen | H04W 52/0225 455/574 |
| 2012/0327849 | A1* | 12/2012 | Lin | H04W 48/20 370/328 |
| 2014/0328234 | A1 | 11/2014 | Cherian et al. | |
| 2016/0165637 | A1* | 6/2016 | Kim | H04W 28/18 370/329 |

(Continued)

FOREIGN PATENT DOCUMENTS

| CN | 102843781 A | * | 12/2012 | ............ H04W 48/20 |
| EP | 2020788 A2 | | 2/2009 | |
| WO | WO-2019124970 A1 | * | 6/2019 | |

OTHER PUBLICATIONS

English-translated document, Choi et al. WO-2019124970 A1 (Year: 2019).*

(Continued)

*Primary Examiner* — Peter Chen
(74) *Attorney, Agent, or Firm* — Foley & Lardner LLP

(57) ABSTRACT

Disclosed herein are related to resuming a wireless communication between a first device and a second device. In one aspect, the first deice enters a wake up mode from a sleep mode. In one aspect, the first device obtains, in response to entering the wake up mode, stored information indicating a wireless channel previously used to communicate with a second device, to monitor for a beacon frame from the second device. In one aspect, the first device receives the beacon frame from the second device, according to the stored information. In one aspect, the first device transmits to the second device, an association frame in response to receiving the beacon frame.

17 Claims, 7 Drawing Sheets

(56) References Cited

U.S. PATENT DOCUMENTS

2020/0287653 A1  9/2020  Zheng et al.
2020/0344695 A1* 10/2020  Wang ................ H04W 52/0222

OTHER PUBLICATIONS

English-translated document of Lin et al. CN-102843781-A (Year: 2012).*
International Search Report and Written Opinion for International Application No. PCT/US2022/012510, mailed Jun. 30, 2022, 19 pages.

* cited by examiner

METHODS AND SYSTEMS FOR LOW POWER RECONNECTION

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a computing device communicatively coupled to the HWD. In one example, the HWD includes various sensors that detect a location and/or orientation of the HWD, and transmits the detected location and/or orientation of the HWD to the computing device. The computing device can determine a user's view of the space of the artificial reality according to the detected location and/or orientation of the HWD, and generate image data indicating an image of the space of the artificial reality corresponding to the user's view. The computing device can transmit the image data to the HWD, according to which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., 11 ms or 16 ms). Any latency between a movement of the user wearing the HWD and an image displayed corresponding to the user movement can cause judder, which may result in motion sickness and can degrade the user experience.

SUMMARY

Various embodiments disclosed herein are related to a method of resuming wireless communication between a first device and a second device. In some embodiments, the method includes entering, by a first device, a wake up mode from a sleep mode. In some embodiments, the method includes obtaining, by the first device, in response to entering the wake up mode, stored information indicating a wireless channel previously used to communicate with a second device, to monitor for a beacon frame from the second device. In some embodiments, the method includes receiving, by the first device, the beacon frame from the second device, according to the stored information. In some embodiments, the method includes transmitting, by the first device to the second device, an association frame in response to receiving the beacon frame.

In some embodiments, the association frame allows the second device to perform association with the first device to resume wireless communication. In some embodiments, the stored information further indicates a target beacon transmission time of the second device. In some embodiments, the method includes predicting, by the first device according to the stored information, a first time at which the second device is scheduled to transmit the beacon frame. In some embodiments, the first device enters the wake up mode at a second time before the predicted first time.

In some embodiments, the first device is configured to monitor for the association frame while bypassing channel scanning. In some embodiments, the method includes generating the stored information based on the wireless channel previously used to communicate with the second device. In some embodiments, the first device comprises a head wearable device, and the second device comprises a soft access point.

Various embodiments disclosed herein are related to a first device comprising a wireless interface and one or more processors coupled to the wireless interface. In some embodiments, the wireless interface is configured to communicate with a second device through a wireless communication link. In some embodiments, the one or more processors are configured to cause the wireless interface to enter a wake up mode from a sleep mode. In some embodiments, the one or more processors are configured to obtain, in response to entering the wake up mode, stored information indicating a wireless channel previously used to communicate with a second device to monitor for a beacon frame from the second device. In some embodiments, the one or more processors are configured to cause the wireless interface to receive the beacon frame from the second device, according to the stored information. In some embodiments, the one or more processors are configured to cause the wireless interface to transmit an association frame to the second device, in response to receiving the beacon frame.

In some embodiments, the association frame allows the second device to perform association with the first device to resume wireless communication. In some embodiments, the stored information further indicates a target beacon transmission time of the second device. In some embodiments, the one or more processors are configured to predict, according to the stored information, a first time at which the second device is scheduled to transmit the beacon frame. In some embodiments, the one or more processors are configured to cause the wireless interface to enter the wake up mode at a second time before the predicted first time.

In some embodiments, the one or more processors are configured to monitor for the association frame while bypassing a channel scanning. In some embodiments, the one or more processors are configured to generate the stored information based on the wireless channel previously used to communicate with the second device. In some embodiments, the first device comprises a head wearable display, and the second device comprises a soft access point.

Various embodiments disclosed herein are related to a first device including a wireless interface and one or more processors coupled to the wireless interface. In some embodiments, the wireless interface is configured to communicate with a second device through a wireless communication link. In some embodiments, the one or more processors are configured to determine a time period, and cause the wireless interface to periodically switch between a wake up mode and a sleep mode according to the time period, until an association is completed with the second device to resume wireless communication of data. In some embodiments, the time period is set according to a listening interval of the second device. In some embodiments, the one or more processors are configured to cause, for each switch to the wake up mode from the sleep mode according to the time period, the wireless interface to transmit an association frame to the second device according to stored information to establish the wireless communication link with the second device.

In some embodiments, the second device is configured to switch between another wake up mode and another sleep mode of the second device. In some embodiments, the second device is configured to receive the association frame while the second device is in the another wake up mode during the listening interval. In some embodiments, the one or more processors are configured to determine the time period to allow at least one switch to the wake up mode from the sleep mode to occur while the second device is in the another wake up mode. In some embodiments, the second device is configured to receive the association frame, while bypassing use of beacon frames.

In some embodiments, the stored information indicates a wireless channel previously used to communicate with the second device. In some embodiments, the one or more processors are configured to cause, for each switch to the wake up mode from the sleep mode according to the time period, the wireless interface to transmit the association frame to the second device through the wireless channel previously used to communicate with the second device.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
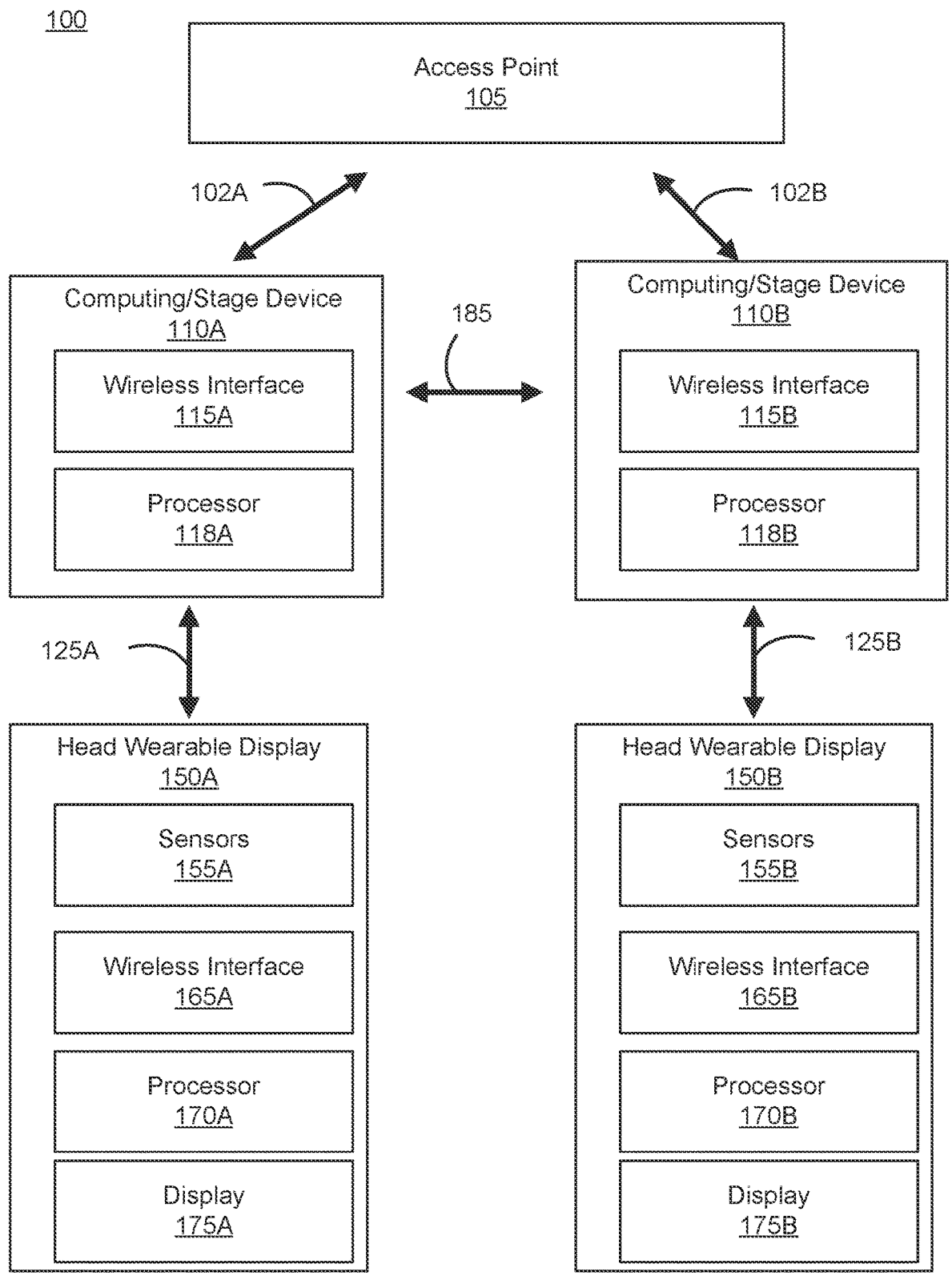
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for resuming a wireless communication between a first device and a second device. The first device and the second device may be mobile devices. In one aspect, the first device and the second device may periodically enter (e.g., switch between) a sleep mode and a wake up mode. In the wake up mode, the first device, the second device, or both may communicate with each other and generate and store the re-association information. The re-association information may indicate, for example, a channel (e.g., frequency band) and/or timing (e.g., synchronization, clock information) of the communication between the first device and the second device. In the sleep mode, the first device and the second device may be disabled (e.g., in inactive or low power operation) to conserve power. The first device, the second device, or both may attempt to resume communication in a subsequent wake up mode, according to the re-association information. For example, the first device, the second device, or both may initiate communication according to the channel used in the previous communication session. For example, the first device, the second device, or both may schedule and may enter the subsequent wake up mode, according to the timing of the previous communication session. In one aspect, the first device and the second device may resume communication based on the re-association information without performing a scan procedure. Scan procedure may involve searching for available channels and/or performing handshake and/or authentication. Bypassing the scan procedure allows the first device and the second device to resume communication with a reduced latency and can achieve power savings.

In one aspect, the first device may be a HWD, and the second device may be an intermediate device between an access point and the first device. The first device may operate as a station device for a communication link (interlink) between the second device and the access point. The second device may receive content for artificial reality from the access point. The second device may also operate as a soft access point (e.g., a software enabled access point) for a communication link (intralink) between the second device and the first device. In one example, the first device detects a location and/or orientation of the first device, and transmits the detected location and/or orientation of the first device to the second device through a wireless connection. The second device can determine a user's view of the space of the artificial reality according to the detected location and/or orientation of the first device, and can generate image data indicating an image of the space of the artificial reality corresponding to the user's view. The second device can transmit the image data to the first device, by which the image of the space of the artificial reality corresponding to the user's view can be presented to the user. After transmitting the image data, the first device and the second device may enter a sleep mode to conserve power, until a next frame time (e.g., 11 ms or 16 ms). In one aspect, the first device and the second device may resume communication based on the re-association information (e.g., retrieved from storage) without performing a scan procedure, such that time/latency for communication between the first device and the second device to render artificial reality can be reduced. Hence, artificial reality can be presented in a seamless manner with reduced latency by obviating the scan procedure. Moreover, time duration for the first device and the second device operating in the sleep mode can be increased to achieve power savings.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a computing device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations.

In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 (sometimes referred to as a stage device, or an AR/VR computing device) is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced. In some embodiments, the processors 118, 170 may configure or cause the wireless interfaces 115, 165 to resume communication based on stored information indicating communication between the computing device 110 and the HWD 150. In the wake up mode, the processors 118, 170 may generate and store information (e.g., channel, timing) of the communication between the computing device 110 and the HWD 150. The processors 118, 170 may schedule the wireless interfaces 115, 165 to enter a subsequent wake up mode according to timing of the previous communication indicated by the stored information. For example, the wireless interfaces 115, 165 may predict when to enter the subsequent wake up mode, according to timing of the previous wake up mode, and schedule to enter the subsequent wake up mode at the predicted time. After generating and storing the information and scheduling the subsequent wake up mode, the processors 118, 170 may configure or cause the wireless interfaces 115, 165 to enter the sleep mode. When entering the wake up mode, the processors 118, 170 may cause or configure the wireless interfaces 115, 165 to resume communication via the channel or frequency band of the previous communication indicated by the stored information. Accordingly, the wireless interfaces 115, 165 entering the wake up mode from the sleep mode may resume communication, while bypassing a scan procedure to search for available channels and performing handshake or authentication. Bypassing the scan procedure allows extension of a duration of the wireless interfaces 115, 165 operating in the sleep mode, such that the computing device 110 and the HWD 150 can reduce power consumption. Detailed descriptions on resuming communication based on stored information are provided below with respect to FIGS. 3 through 6 below.

In some embodiments, the computing devices 110A, 110B may coordinate operations to reduce collisions or interferences. In one approach, the computing device 110A may transmit a beacon frame periodically to announce or advertise a presence of a wireless link 125A between the computing device 110A and the HWD 150A and coordinate the communication between the computing device 110A and the HWD 150A. The computing device 110B may receive the beacon frame from the computing device 110A, and may schedule communication with the HWD 150B to avoid collision or interference with the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 10 feet) may coexist and operate with reduced interference.

Figure 2:
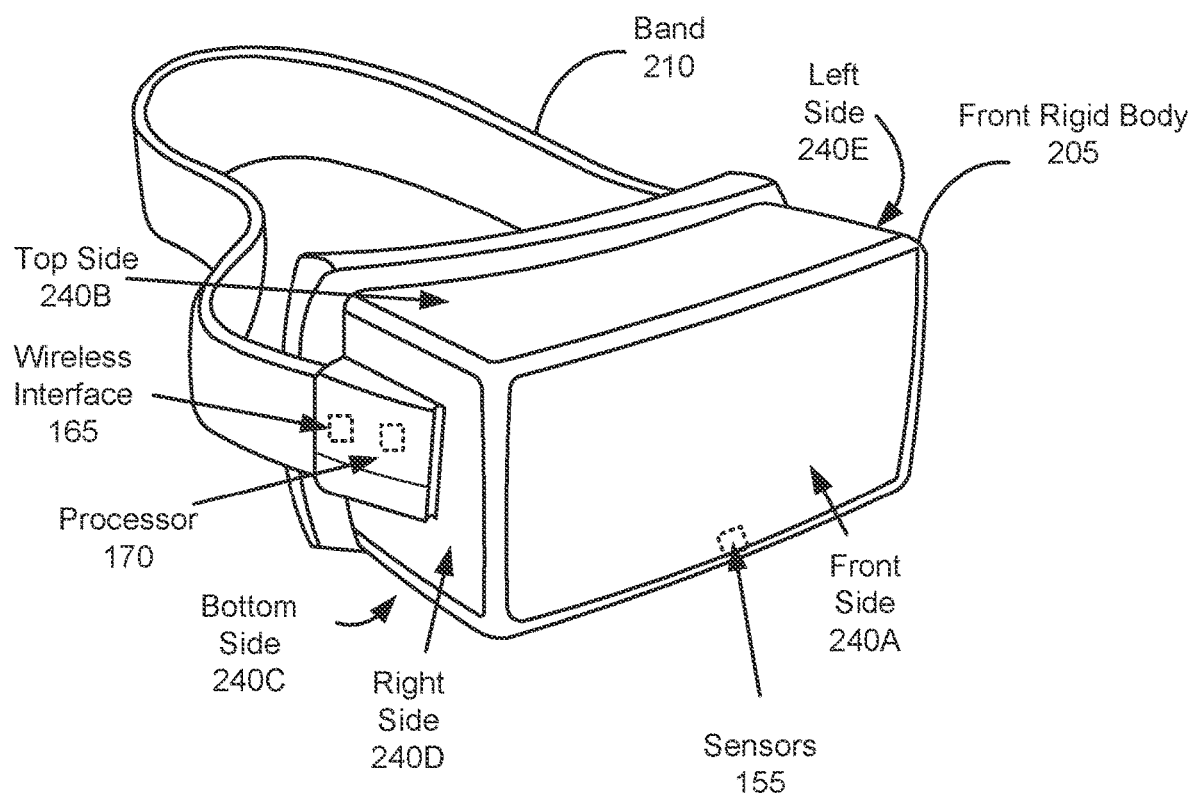
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the display 175 (not shown in FIG. 2), the lens (not shown in FIG. 2), the sensors 155, the wireless interface 165, and the processor 170. In the embodiment shown by FIG. 2, the wireless interface 165, the processor 170, and the sensors 155 are located within the front rigid body 205, and may not visible to the user. In other embodiments, the HWD 150 has a different configuration than shown in FIG. 2. For example, the wireless interface 165, the processor 170, and/or the sensors 155 may be in different locations than shown in FIG. 2.

Figure 3:
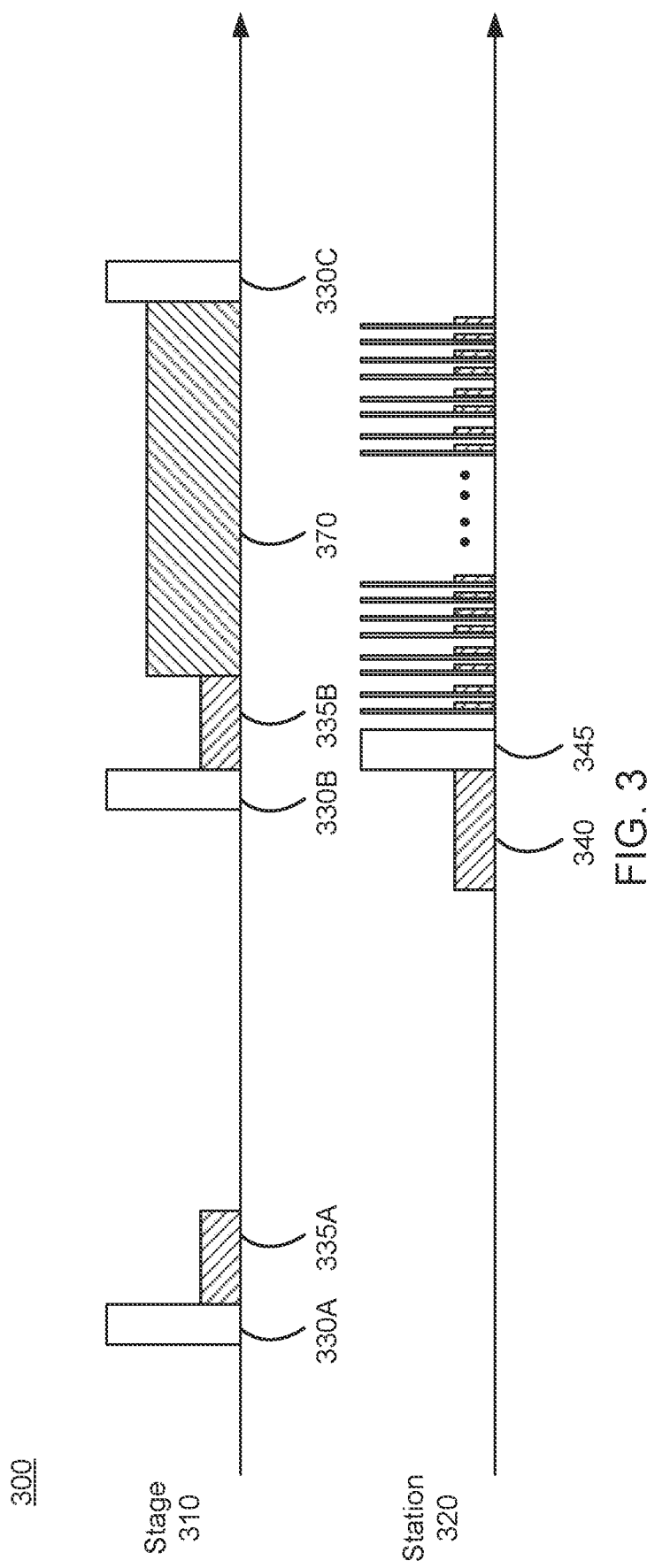
FIG. 3 is a timing diagram showing a process of resuming communication between a computing device and a station device, according to an example implementation of the present disclosure.

FIG. 3 is a timing diagram 300 showing a process of resuming communication between a computing device 310 and a station device 320, according to an example implementation of the present disclosure. The computing device 310 may be the computing device 110 and the station device 320 may be the HWD 150 of FIG. 1. The computing device 310 and the station device 320 may be mobile devices. In one approach, the computing device 310 may periodically enter or switch between a sleep mode and a wake up mode. In the wake up mode, the computing device 310 may enable wireless interface (e.g., wireless interface 115) for association with the station device 320. In one aspect, the computing device 310 and the station device 320 can exchange data after performing device association. In the sleep mode, the computing device 310 may disable the wireless interface (e.g., wireless interfaces 115) to conserve power.

In one approach, during beacon transmission time intervals 330A, 330B, 330C, the computing device 310 may operate in a wake up mode periodically (e.g., every 300 ms) and can transmit beacon frames. A beacon frame may announce/advertise/provide a SSID and/or data rate of a wireless link, and can indicate a timing (e.g., target beacon transmission time (TBTT) and/or a duration) of transmission of the beacon frame. A duration of each beacon transmission time interval 330 may be 1~2 ms.

In one approach, when in communication with the computing device 310, the station device 320 may generate and store re-association information. Re-association information may indicate a channel and/or timing of the communication with the computing device 310. In one example, the station device 320 may configure, predict or estimate a timing of a subsequent beacon transmission time interval 330, according to the re-association information, and can schedule to enter a wake up mode at or before the predicted timing of the subsequent beacon transmission time interval 330. In the wake up mode, the station device 320 may monitor for a beacon frame from the computing device 310. The station device 320 may monitor for the beacon frame through a channel or a frequency band specified by the re-association information. In response to receiving the beacon frame, the station device 320 may transmit an association frame. The association frame may include SSID of the wireless link, MAC address of the station device 320, and security settings.

After transmitting the beacon frame, the computing device 310 may operate in the wake up mode and monitor for an association frame from the station device 320 for a listening time interval 335. Duration of each listening time interval 335 may be 2~3 ms. In response to receiving the association frame within the listening time interval 335, the computing device 310 may perform association with the station device 320 to exchange data. In response to not receiving an association frame within the listening time interval, the computing device 310 may enter the sleep mode and disable the wireless interface until the subsequent beacon transmission time interval 330.

Advantageously, the station device 320 may resume communication with the computing device 310 based on the re-association information without performing a scan procedure. A scan procedure may involve searching for available channels, and performing handshake and/or authentication. By bypassing the scan procedure, the computing device 310 and the station device 320 may resume communication with a reduced latency and achieve power savings.

In the example shown in FIG. 3, the computing device 310 may transmit a beacon frame during the beacon transmission time interval 330A, and can monitor for an association frame from the station device 320 during the listening time interval 335A. In the example shown in FIG. 3, the station device 320 may be disabled or may operate in the sleep mode during the beacon transmission time interval 330A, and may not receive the beacon frame transmitted during the beacon transmission time interval 330A. Because the station device 320 in the sleep mode may not receive the beacon frame during the beacon transmission time interval 330A, the station device 320 may not transmit an association frame during the listening time interval 335A. Accordingly, the computing device 310 may not receive the association frame from the station device 320 during the listening time interval 335A, and enter the sleep mode after the listening time interval 335A.

In the example shown in FIG. 3, the station device 320 may be scheduled to enter a wake up mode and can monitor, during a beacon detection period 340, for a beacon frame from the computing device 310. The station device 320 may predict the beacon transmission time interval 330B according to the stored re-association information, and can schedule the beacon detection period 340 according to the predicted beacon transmission time interval 330B to receive the beacon frame. For example, the beacon detection period 340 may be determined to begin a predetermined time interval (e.g., 1 ms) before the predicted timing of the start of the beacon transmission time interval 330B. In response to receiving the beacon frame from the computing device 310, the station device 320 may transmit an association frame during the association frame transmission time interval 345. In response to the beacon frame transmitted during the beacon transmission time interval 330B, the computing device 310 may receive the association frame from the station device 320 during the listening time interval 335B, and may perform association with station device 320 according to the association frame. According to the association with the station device 320, the computing device 310 may operate in the wake up mode during the communication time interval 370 until the subsequent beacon transmission time interval 330C to exchange data with the station device 320. For example, the computing device 310 may receive, from the station device 320, sensor measurements indicating location and orientation of the station device 320, and can provide image data indicating a view of artificial reality corresponding to the location and orientation of the station device 320. The station device 320 may render artificial reality according to the image data.

Figure 4:
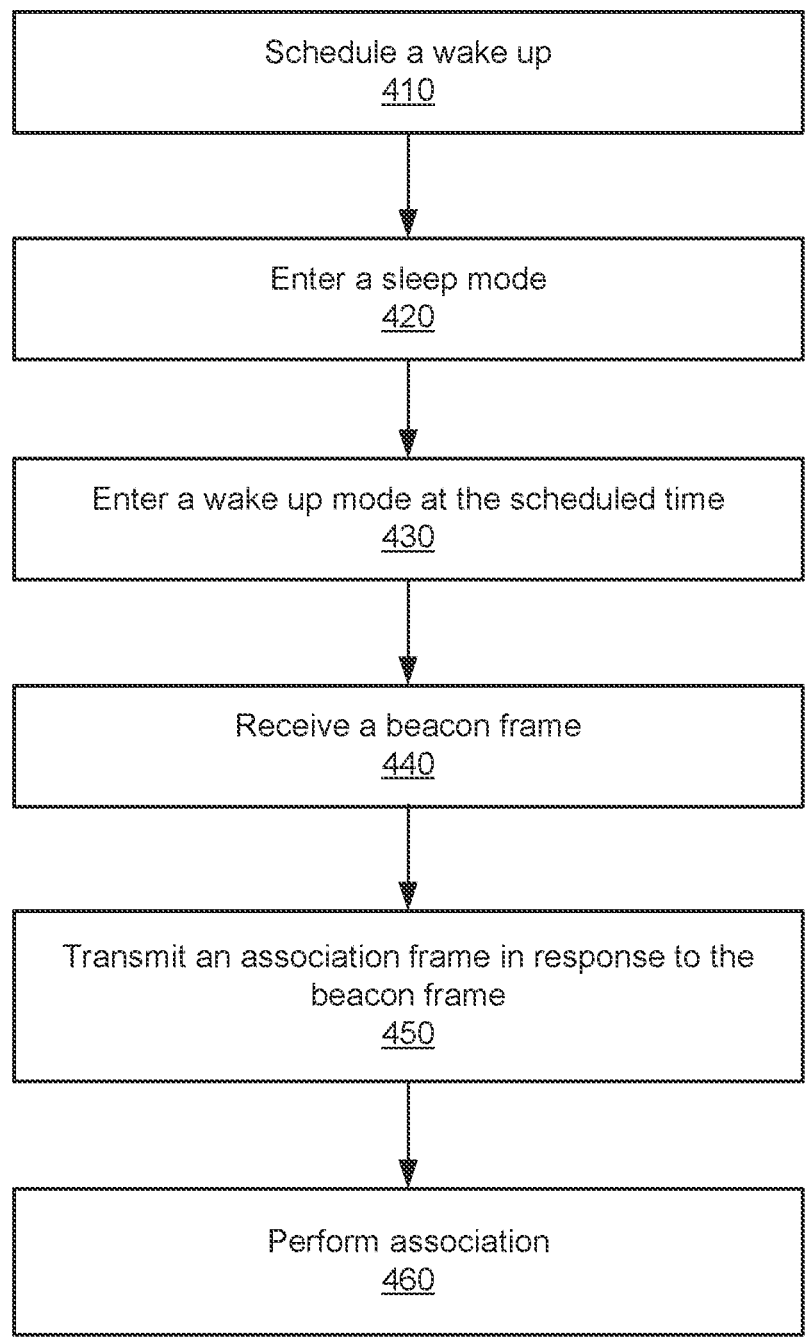
FIG. 4 is a flowchart showing a process of resuming communication between a computing device and a station device, according to an example implementation of the present disclosure.

FIG. 4 is a flowchart showing a process 400 of resuming communication between a computing device and a station device, according to an example implementation of the present disclosure. In some embodiments, the process 400 is performed by the station device (e.g., station device 320 or HWD 150). In some embodiments, the process 400 is performed by other entities. In some embodiments, the process 400 includes more, fewer, or different steps than shown in FIG. 4.

In one approach, the station device schedules 410 a wake up. In one approach, the station device predicts/determines when the subsequent beacon transmission will occur, based on re-association information. The station device may predict/determine when the subsequent beacon transmission will/can occur based on timing of the previous beacon transmission time. For example, the station device may predict the subsequent beacon transmission will occur at a beacon transmission time period (e.g., 300 ms) or a multiple of the beacon transmission time period from the timing of the previous beacon transmission time. The station device may schedule to enter the wake up mode at the predicted time or a predetermined time (e.g., 1~2 ms) before the predicted time. After scheduling the wake up, the station device may enter 420 a sleep mode. In the sleep mode, the station device may disable (e.g., reduce operations in) a wireless interface (e.g., wireless interface 165) to reduce power consumption. The station device may enter 430 a wake up mode at the scheduled time.

In one approach, the station device receives 440 a beacon frame from the computing device 110 during a listening time interval after entering the wake up mode. A beacon frame may announce a SSID and/or a data rate of a wireless link, and/or may indicate a timing (e.g., target beacon transmission time (TBTT) and/or a duration) of transmission of the beacon frame. The station device may obtain re-association information, and can monitor for the beacon frame according to the re-association information. The re-association information may indicate a TBTT and/or channel of previous communication with the computing device. The station device may generate and can store the re-association information during the previous communication with the computing device. The station device may monitor a channel indicated by the re-association information to receive the beacon frame. In one aspect, the station device may receive the beacon frame without a scan procedure. A scan procedure may involve searching for available channels and/or performing handshake or authentication. Bypassing the scan procedure allows the computing device and the station device to resume communication with a reduced latency and can achieve power savings.

In one approach, the station device transmits 450 an association frame in response to the beacon frame. The association frame may include a SSID of the wireless link, a MAC address of the station device 320, and/or security settings. In one approach, the station device performs 460 association (e.g., handshaking and/or connection/linking) with the computing device and can exchange data with the computing device according to the association. For example, the computing device and the station device may exchange data for presenting artificial reality according to the association between the computing device and the station device. For example, the computing device may receive, from the station device, sensor measurements indicating location and orientation of the station device, and can provide image data indicating a view of artificial reality corresponding to the location and orientation of the station device according to the association between the computing device and the station device. The station device 320 may render artificial reality according to the image data.

Figure 5:
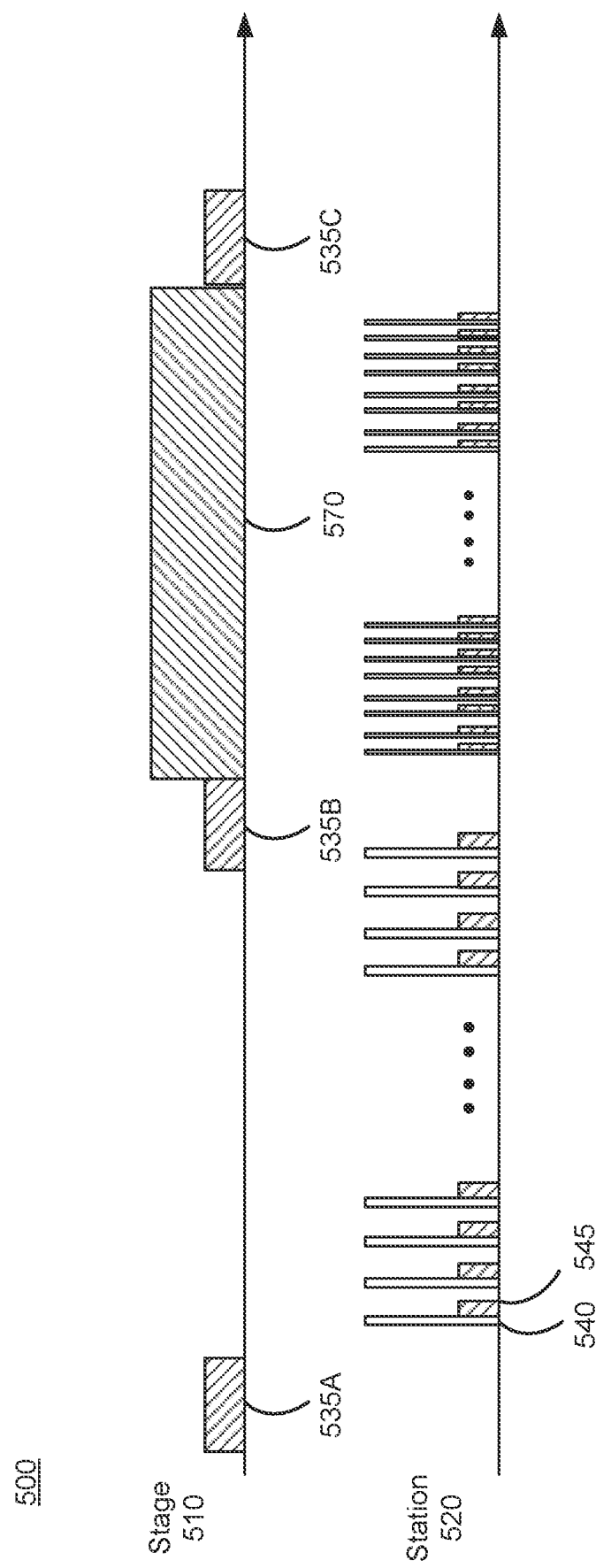
FIG. 5 is a timing diagram showing a process of resuming communication between a computing device and a station device, according to an example implementation of the present disclosure.

FIG. 5 is a timing diagram showing a process 500 of resuming communication between a computing device 510 and a station device 520, according to an example implementation of the present disclosure. The computing device 510 may be the computing device 110 and the station device 520 may be the HWD 150 of FIG. 1. The computing device 510 and the station device 520 may be mobile devices. In one approach, the computing device 510 may periodically enter a sleep mode and a wake up mode. In the wake up mode, the computing device 510 may enable wireless interface (e.g., wireless interface 115) for an association with the station device 520. In the sleep mode, the computing device 510 may disable the wireless interface (e.g., wireless interface 115) to conserve power.

In one approach, the computing device 510 may periodically enter a wake up mode and a sleep mode every association frame listening time interval. The association frame may include a SSID of the wireless link, a MAC address of the station device 520, and/or security settings. For example, the computing device 510 may periodically (e.g., every 100 ms) enable the wireless interface 115 during association frame listening time intervals 535A, 535B, 555C to monitor for an association frame from the station device 520. Duration of each association frame listening time interval 535 may be 10~20 ms. The computing device 510 may enable the wireless interface 115 during the association frame listening time intervals 535A, 535B, 555C without transmitting any beacon frame.

In one example, the station device 520 may determine a time period, and can schedule the wireless interface (e.g., wireless interface 165) of the station device 520 to periodically switch between a wake up mode and a sleep mode according to the time period. In the wake up mode, the station device 520 may transmit an association frame during an association frame transmission time interval 540, and can monitor for an acknowledge frame from the computing device 510 for an acknowledgement frame listening time interval 545 after the association frame transmission time interval 540. Duration of the association frame transmission time interval 540 and the acknowledgement frame listening time interval 545 may be 1~2 ms. In response to receiving the acknowledgement frame, the station device 520 may perform association with the computing device 510, and can exchange data with the computing device 510 according to the association. In response to not receiving the acknowledgement frame, the station device 520 may enter a sleep mode until a subsequent association frame transmission time interval 540 according to the determined time period.

In one aspect, the station device 520 may configure, set or determine the time period to be equal to or less than the duration of the association frame listening time interval 535 (e.g., 10~20 ms). Hence, at least one switch to the wake up mode from the sleep mode of the station device 520 may occur while the computing device 510 is in the wake up mode in the association frame listening time interval 535. Accordingly, the computing device 510 may receive an association frame from the station device 520 during the association frame listening time interval 535, and can perform association with the station device 520 to resume communication with the station device 520.

In one aspect, the station device 520 may resume communication with the computing device 510 based on the re-association information without performing a scan procedure. For example, the computing device 510 may transmit an association frame, according to a channel or a frequency band specified by the re-association information. The scan procedure may involve searching for available channels and/or performing handshake or authentication. By bypassing the scan procedure, the computing device 510 and the station device 520 may resume communication with a reduced latency and achieve power savings.

In the example shown in FIG. 5, the computing device 510 may enter a wake up mode to monitor for an association frame during the association frame listening time interval 535A. In the example shown in FIG. 5, the station device 520 may be disabled or may operate in the sleep mode during the association frame listening time interval 535A, and may not transmit the association frame during the association frame listening time interval 535A. Accordingly, the computing device 510 may not receive the association frame from the station device 520 during the association frame listening time interval 535A, and may enter the sleep mode after the association frame listening time interval 535A.

In the example shown in FIG. 5, the station device 520 may be scheduled to enter a wake up mode and transmit, during an association frame transmission time interval 540, an association frame. After transmitting the association frame, the station device 520 may monitor, for an acknowledgement frame from the computing device 510 during the acknowledgement frame listening time interval 545. The station device 520 may switch between the sleep mode and the wake up mode periodically (e.g., every time period or every 10~20 ms), until receiving the acknowledgement frame from the computing device 510. For example, the computing device 510 may receive the association frame from the station device 520 during the association frame listening time interval 535B, and can transmit an acknowledgement frame to confirm receipt of the association frame. The station device 520 may receive the acknowledgement frame from the computing device 510 during an acknowledgement frame listening time interval 545, and can perform association with the computing device in response to the acknowledgement frame. According to the association, the computing device 510 and the station device 520 may resume communication to exchange data. For example, the computing device 510 may receive, from the station device 520, sensor measurements indicating location and orientation of the station device 520, and provide image data indicating a view of artificial reality corresponding to the location and orientation of the station device 320 according to the association. The station device 320 may render artificial reality according to the image data.

Figure 6:
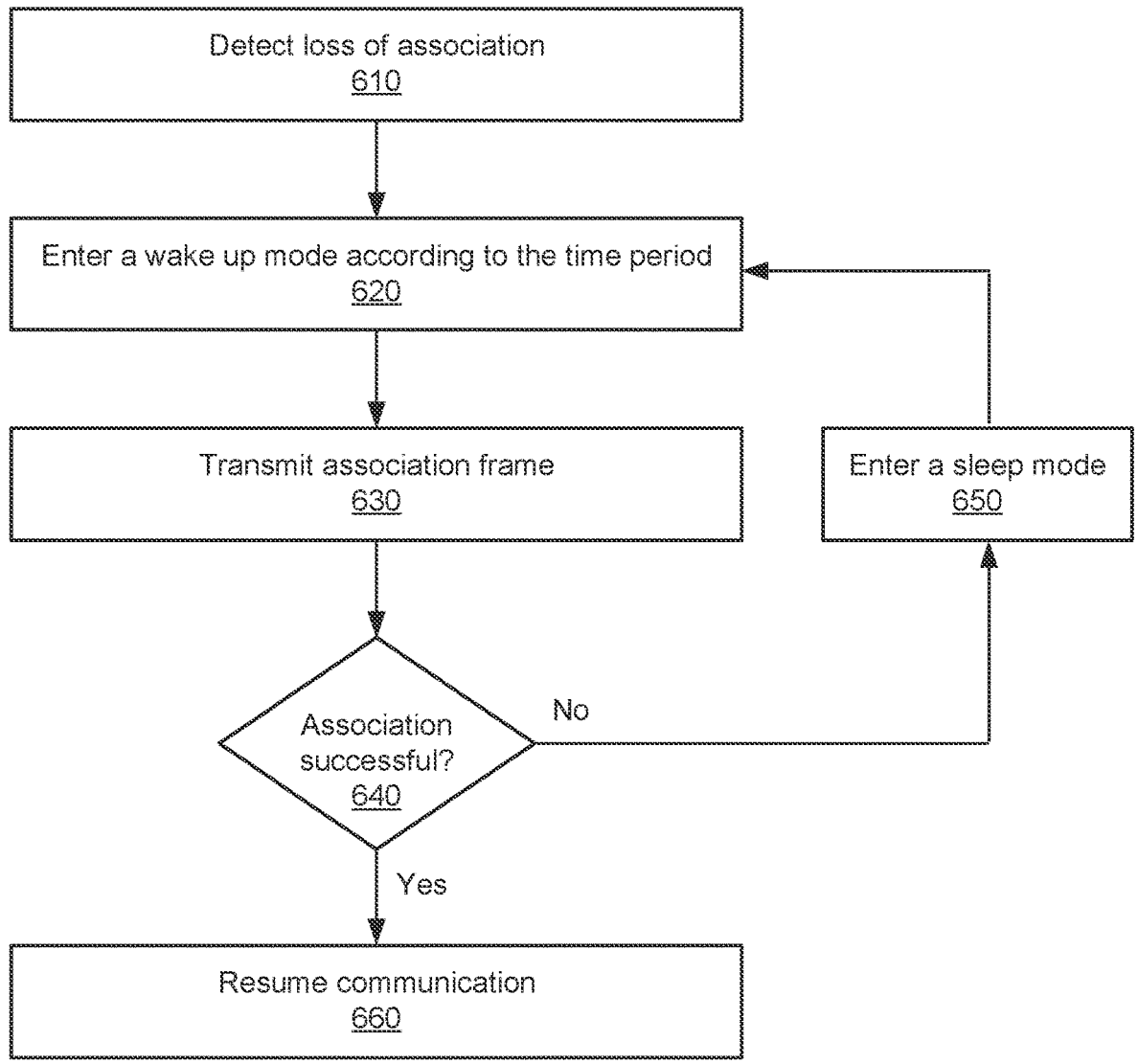
FIG. 6 is a flowchart showing a process of resuming communication between a computing device and a station device, according to an example implementation of the present disclosure.

FIG. 6 is a flowchart showing a process 600 of resuming communication between a computing device and a station device, according to an example implementation of the present disclosure. In some embodiments, the process 600 is performed by the station device (e.g., station device 520 or HWD 150). In some embodiments, the process 600 is performed by other entities. In some embodiments, the process 600 includes more, fewer, or different steps than shown in FIG. 6.

In one approach, the station device detects 610 a loss of association or loss of connection with the computing device. The station device may detect the loss of association or loss of connection with the computing device, in response to detecting unsuccessful communication with the computing device.

In response to detecting the loss of association with the computing device, the station device may enter 620 or schedule to enter a wake up mode. The station device may operate in the wake up mode for an association frame transmission time interval to transmit an association frame. Duration of the association frame transmission time interval may be 1~2 ms. In one example, the station device may schedule to enter the wake up mode, according to a time period. The time period may be equal to or less than a duration (e.g., 10~20 ms) of a listening time interval of the computing device. The computing device may periodically switch between the wake up mode and the sleep mode, and monitor for an association frame from the station device.

In one approach, the station device may transmit an association frame during the association frame transmission time interval. The association frame may include a SSID of the wireless link, a MAC address of the station device 320, and/or security settings. In response to the association frame, the computing device may perform association with the computing device, and can transmit an acknowledge frame in response to receipt of the association frame.

In one approach, the station device may determine 640 whether association with the computing device is successful or not. For example, the station device may monitor for an acknowledgement frame from the computing device for an acknowledgement frame listening time period after transmitting the association frame. Duration of the acknowledgement frame listening time period may be 1~2 ms.

In response to not receiving the acknowledgement frame during the acknowledge frame listening time period, the station device may determine that the association with the computing device is unsuccessful, and may enter 650 a sleep mode until the subsequent association frame transmission time interval according to the time period. When the subsequent association frame transmission time interval occurs, the station device may proceed to the step 620.

In response to receiving the acknowledgement frame during the acknowledge frame listening time period, the station device may determine that the association with the computing device is successful, and can resume 660 communication with the computing device according to the association. For example, the station device may transmit sensor measurements indicating a location and/or an orientation of the station device and receive image data indicating a view of artificial reality corresponding to the location and orientation of the station device according to the association.

In one aspect, the station device may resume communication with the computing device based on the re-association information without performing a scan procedure. For example, the computing device may transmit an association frame, according to a channel or a frequency band specified by the re-association information. The scan procedure may involve searching for available channels and/or performing handshake or authentication. By bypassing the scan procedure, the computing device and the station device may resume communication with a reduced latency and achieve power savings.

Figure 7:
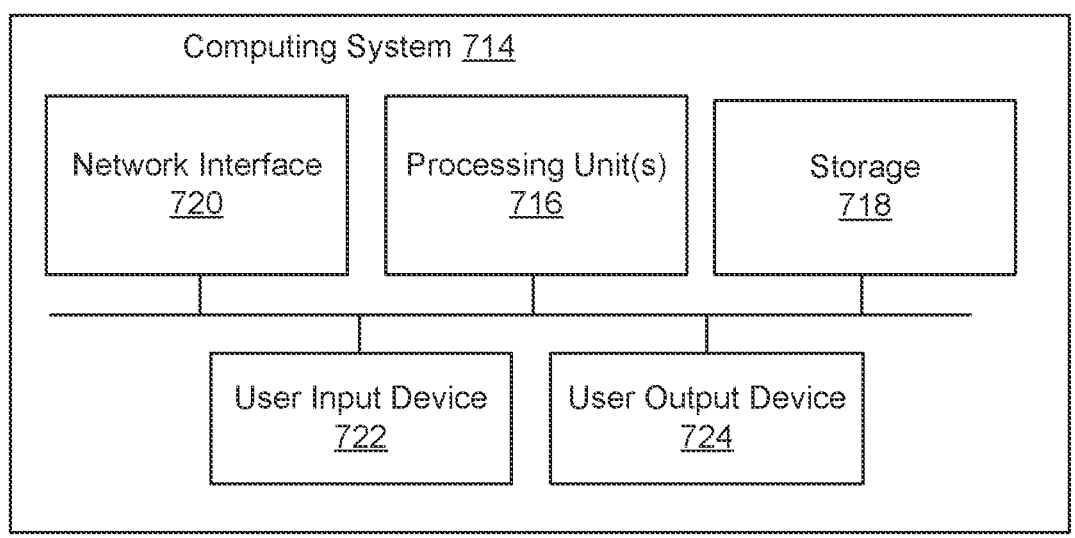
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the computing device 110, the HWD 150 or both of FIG. 1 are implemented by the computing system 714. Computing system 714 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 714 can be implemented to provide VR, AR, MR experience. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests or information. User input device 722 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 13'" can include only 'A', only 13', as well as both 'A' and 13'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
entering, by a first device, a wake up mode from a sleep mode;
obtaining, by the first device, in response to entering the wake up mode, stored information indicating a wireless channel previously used to communicate with a second device, the first device to monitor for a beacon frame from the second device, through the wireless channel previously used to communicate with the second device indicated by the stored information;
receiving, by the first device, the beacon frame from the second device, through the wireless channel previously used to communicate with the second device indicated by the stored information; and
transmitting, by the first device to the second device, an association frame in response to receiving the beacon frame,
wherein the second device is an access point (AP) and the first device is a non-AP station (STA),
wherein the stored information indicating the wireless channel includes a frequency band of the wireless channel and timing of a previous communication between the first device and the second device,
wherein the first device and the second device are configured to resume wireless communication without channel scanning.

2. The method of claim 1, wherein the association frame allows the second device to perform association with the first device to resume wireless communication.

3. The method of claim 1, wherein the stored information further indicates a target beacon transmission time of the second device.

4. The method of claim 3, further comprising:
predicting, by the first device according to the stored information, a first time at which the second device is scheduled to transmit the beacon frame, wherein the first device enters the wake up mode at a second time before the predicted first time.

5. The method of claim 1, further comprising:
generating the stored information based on the wireless channel previously used to communicate with the second device.

6. The method of claim 1, wherein the first device comprises a head wearable device, and the second device comprises a soft access point.

7. A first device comprising:
a wireless interface configured to communicate with a second device through a wireless communication link; and
one or more processors coupled to the wireless interface, the one or more processors configured to:
cause the wireless interface to enter a wake up mode from a sleep mode,
obtain, in response to entering the wake up mode, stored information indicating a wireless channel previously used to communicate with the second device, the first device to monitor for a beacon frame from the second device, through the wireless channel previously used to communicate with the second device indicated by the stored information,
cause the wireless interface to receive the beacon frame from the second device, through the wireless channel previously used to communicate with the second device indicated by the stored information, and
cause the wireless interface to transmit an association frame to the second device, in response to receiving the beacon frame,
wherein the second device is an access point (AP) and the first device is a non-AP station (STA),
wherein the stored information indicating the wireless channel includes a frequency band of the wireless channel and timing of a previous communication between the first device and the second device,
wherein the first device and the second device are configured to resume wireless communication without channel scanning.

8. The first device of claim 7, wherein the association frame allows the second device to perform association with the first device to resume wireless communication.

9. The first device of claim 7, wherein the stored information further indicates a target beacon transmission time of the second device.

10. The first device of claim 9, wherein the one or more processors are configured to:
predict, according to the stored information, a first time at which the second device is scheduled to transmit the beacon frame, and
cause the wireless interface to enter the wake up mode at a second time before the predicted first time.

11. The first device of claim 7, wherein the one or more processors are configured to generate the stored information based on the wireless channel previously used to communicate with the second device.

12. The first device of claim 7, wherein the first device comprises a head wearable display, wherein the second device comprises a soft access point.

13. A first device comprising:
a wireless interface configured to communicate with a second device through a wireless communication link; and
one or more processors coupled to the wireless interface, the one or more processors configured to:
determine a time period,
cause the wireless interface to perform, within a listening interval of the second device, a plurality of switches between a wake up mode and a sleep mode periodically according to the time period, until an association is completed with the second device to resume wireless communication of data, and
cause, for each switch to the wake up mode from the sleep mode according to the time period, the wireless interface to transmit an association frame to the second device according to stored information indicating a wireless channel previously used to communicate with the second device, the association frame to establish the wireless communication link with the second device,
wherein the second device is an access point (AP) and the first device is a non-AP station (STA),
wherein the stored information indicating the wireless channel includes a frequency band of the wireless channel and timing of a previous communication between the first device and the second device, wherein the first device and the second device are configured to resume wireless communication without channel scanning.

14. The first device of claim 13, wherein the second device is configured to switch between another wake up mode and another sleep mode of the second device, wherein the second device is configured to receive the association frame while the second device is in the another wake up mode during the listening interval.

15. The first device of claim 14, wherein the one or more processors are configured to determine the time period to allow at least one switch to the wake up mode from the sleep mode to occur while the second device is in the another wake up mode.

16. The first device of claim 14, wherein the second device is configured to receive the association frame, while bypassing use of beacon frames.

17. The first device of claim 13, wherein the one or more processors are configured to cause, for each switch to the wake up mode from the sleep mode according to the time period, the wireless interface to transmit the association frame to the second device through the wireless channel previously used to communicate with the second device indicated by the stored information.

* * * * *